United States Patent
Mallary et al.

(10) Patent No.: US 7,403,356 B1
(45) Date of Patent: Jul. 22, 2008

(54) DISK DRIVE INCLUDING SLIDER MOVER HAVING LOW THERMAL COEFFICIENT OF RESISTIVITY

(75) Inventors: Michael Mallary, Sterling, MA (US); Yan Wu, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 371 days.

(21) Appl. No.: 11/116,730

(22) Filed: Apr. 28, 2005

Related U.S. Application Data

(60) Provisional application No. 60/566,542, filed on Apr. 29, 2004.

(51) Int. Cl.
*G11B 17/32* (2006.01)

(52) U.S. Cl. .................................. 360/235.1

(58) Field of Classification Search .......... 360/235.1, 360/235.2, 294.7, 125.39, 125.43, 125.56; 29/603.05, 603.07, 603.12, 603.15
See application file for complete search history.

(56) References Cited

U.S. PATENT DOCUMENTS

| | | | |
|---|---|---|---|
| 4,777,544 A | 10/1988 | Brown et al. | |
| 5,421,943 A | 6/1995 | Tam et al. | |
| 5,689,478 A * | 11/1997 | Ishii et al. | 369/13.17 |
| 5,768,054 A * | 6/1998 | Brezoczky et al. | 360/246.1 |
| 5,862,015 A | 1/1999 | Evans et al. | |
| 5,880,899 A | 3/1999 | Blachek et al. | |
| 5,959,801 A | 9/1999 | Gillis et al. | |
| 5,965,840 A | 10/1999 | Nagarajan et al. | |
| 5,991,113 A * | 11/1999 | Meyer et al. | 360/75 |
| 5,995,336 A * | 11/1999 | Michalek et al. | 360/320 |
| 6,011,239 A | 1/2000 | Singh et al. | |
| 6,195,219 B1 | 2/2001 | Smith | |
| 6,252,741 B1 * | 6/2001 | Ahn | 360/235.1 |
| 6,400,531 B1 * | 6/2002 | Inoue et al. | 360/235.2 |

(Continued)

FOREIGN PATENT DOCUMENTS

JP 01252565 A * 10/1989

(Continued)

OTHER PUBLICATIONS

"Introduction to Electrical Properties". ASM Ready Reference: Electrical and Magnetic Properties of Metals Data Book (#06333G); 2000 ASM International.*

(Continued)

*Primary Examiner*—Allen T Cao

(57) ABSTRACT

A disk drive includes a drive housing, a storage disk and a slider. The slider includes a head that magnetically interacts with the storage disk. Further, the slider includes a slider mover that moves a portion of the slider to adjust a head-to-disk spacing during operation of the disk drive. In one embodiment, the slider mover is formed from a material having a thermal coefficient of resistivity that is less than approximately 0.001/° C., such as a copper-manganese alloy, a copper-tin alloy or a gold alloy. The slider mover can be formed from a material having a negative thermal coefficient of resistivity. Further, the slider mover can be formed from a material having a resistivity that is less than approximately 15 microohm-centimeters. Additionally, the slider mover can be formed from a material having a melting point that is greater than approximately 750° C. The disk drive can include a drive circuitry and a lead that conducts electricity between the slider mover and the drive circuitry. The lead can be formed from substantially the same materials as the slider mover.

31 Claims, 6 Drawing Sheets

U.S. PATENT DOCUMENTS

| | | | |
|---|---|---|---|
| 6,407,892 B2 * | 6/2002 | Shiroishi | 360/317 |
| 6,452,740 B1 | 9/2002 | Ghoshal | |
| 6,493,183 B1 * | 12/2002 | Kasiraj et al. | 360/126 |
| 6,538,836 B1 | 3/2003 | Dunfield et al. | |
| 6,669,871 B2 * | 12/2003 | Kwon et al. | 252/520.21 |
| 6,768,610 B1 | 7/2004 | Morris et al. | |
| 6,775,103 B2 * | 8/2004 | Kang et al. | 360/236.5 |
| 6,819,531 B2 * | 11/2004 | Shiroishi | 360/317 |
| 6,920,020 B2 * | 7/2005 | Yamanaka et al. | 360/317 |
| 6,927,950 B2 * | 8/2005 | Ito et al. | 360/322 |
| 7,068,468 B2 * | 6/2006 | Kamijima | 360/128 |
| 7,094,718 B2 * | 8/2006 | Kwon et al. | 501/103 |
| 7,095,587 B2 * | 8/2006 | Kurita et al. | 360/317 |
| 7,133,254 B2 * | 11/2006 | Hamann et al. | 360/126 |
| 7,184,246 B2 * | 2/2007 | Sasaki et al. | 360/294.7 |
| 7,203,035 B2 * | 4/2007 | Koide et al. | 360/294.7 |
| 7,262,936 B2 * | 8/2007 | Hamann et al. | 360/128 |
| 2002/0067565 A1 | 6/2002 | Kelemen | |
| 2002/0097528 A1 | 7/2002 | Williams et al. | |
| 2003/0043514 A1 * | 3/2003 | Ito et al. | 360/322 |
| 2003/0174430 A1 | 9/2003 | Takahashi et al. | |
| 2004/0051999 A1 * | 3/2004 | Yazawa et al. | 360/126 |
| 2004/0218302 A1 * | 11/2004 | Maat | 360/59 |
| 2005/0052773 A1 | 3/2005 | Suk | |
| 2005/0057841 A1 | 3/2005 | Stover et al. | |
| 2006/0017046 A1 * | 1/2006 | Kwon et al. | 252/511 |

OTHER PUBLICATIONS

U.S. Appl. No. 10/211,671, filed Aug. 2, 2002, McKenzie et al.

* cited by examiner

DISK DRIVE INCLUDING SLIDER MOVER HAVING LOW THERMAL COEFFICIENT OF RESISTIVITY

RELATED APPLICATION

This application claims the benefit on U.S. Provisional Application Ser. No. 60/566,542 filed on Apr. 29, 2004. The contents of U.S. Provisional Application Ser. No. 60/566,542 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider having an air bearing surface, and a read/write head that transfers information to and from the storage disk. The rotation of the storage disk causes the slider to ride on an air bearing so that the read/write head is at a distance from the storage disk that is referred to as a "head-to-disk spacing" (also sometimes referred to herein as a "flying height").

Because today's disk drives utilize storage disks having increasingly high densities of data tracks, adjusting the head-to-disk spacing to maintain a relatively low flying height during varying operations of the disk drive has become of great importance. For instance, nominal fly heights can now be as small as 5 nanometers or less. However, this desire for a small head-to-disk spacing must be balanced with tribological concerns in order to avoid damage to the read/write head and/or the storage disk, as well as loss of data.

Recently, systems and methods for controlling the head-to-disk spacing have been advanced in the disk drive industry. For example, the slider can include a read/write head and a separate slider mover to which a drive circuitry directs an electrical stimulus. A temperature change of the slider mover occurs as a result of the electrical stimulus, resulting in a deformation of a portion of the slider, which can impact the head-to-disk spacing. Further, the resistance of the slider mover can change dynamically with changes in temperature. These resistance changes affect the heat generated by the slider mover, which in turn can affect the deformation of the slider and the head-to-disk spacing. Monitoring or predicting changes in resistance or temperature of the slider mover in order to adjust voltage and/or current to the slider mover can present very complex challenges under these circumstances.

SUMMARY

The present invention is directed to a disk drive including a drive housing, a storage disk and a slider. The storage disk is rotatably coupled to the drive housing. The slider includes a head that magnetically interacts with the storage disk. Further, the slider includes a slider mover that moves a portion of the slider to adjust a head-to-disk spacing during operation of the disk drive. In one embodiment, the slider mover is formed from a material having a thermal coefficient of resistivity that is less than approximately 0.001/° C. For example, the slider mover can be formed from a copper-manganese alloy, a copper-tin alloy or a gold alloy, as non-exclusive examples.

In one embodiment, the slider mover is formed from a material having a negative thermal coefficient of resistivity. Further, in another embodiment, the slider mover is formed from a material having a resistivity that is less than approximately 15 microohm-centimeters. In yet another embodiment, the slider mover can be formed from a material having a melting point that is greater than approximately 750° C.

Additionally, the disk drive can include a drive circuitry and a lead that conducts electricity between the slider mover and the drive circuitry. In this embodiment, the lead can be formed from substantially the same materials as the slider mover.

The present invention is also directed to a plurality of methods for manufacturing a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
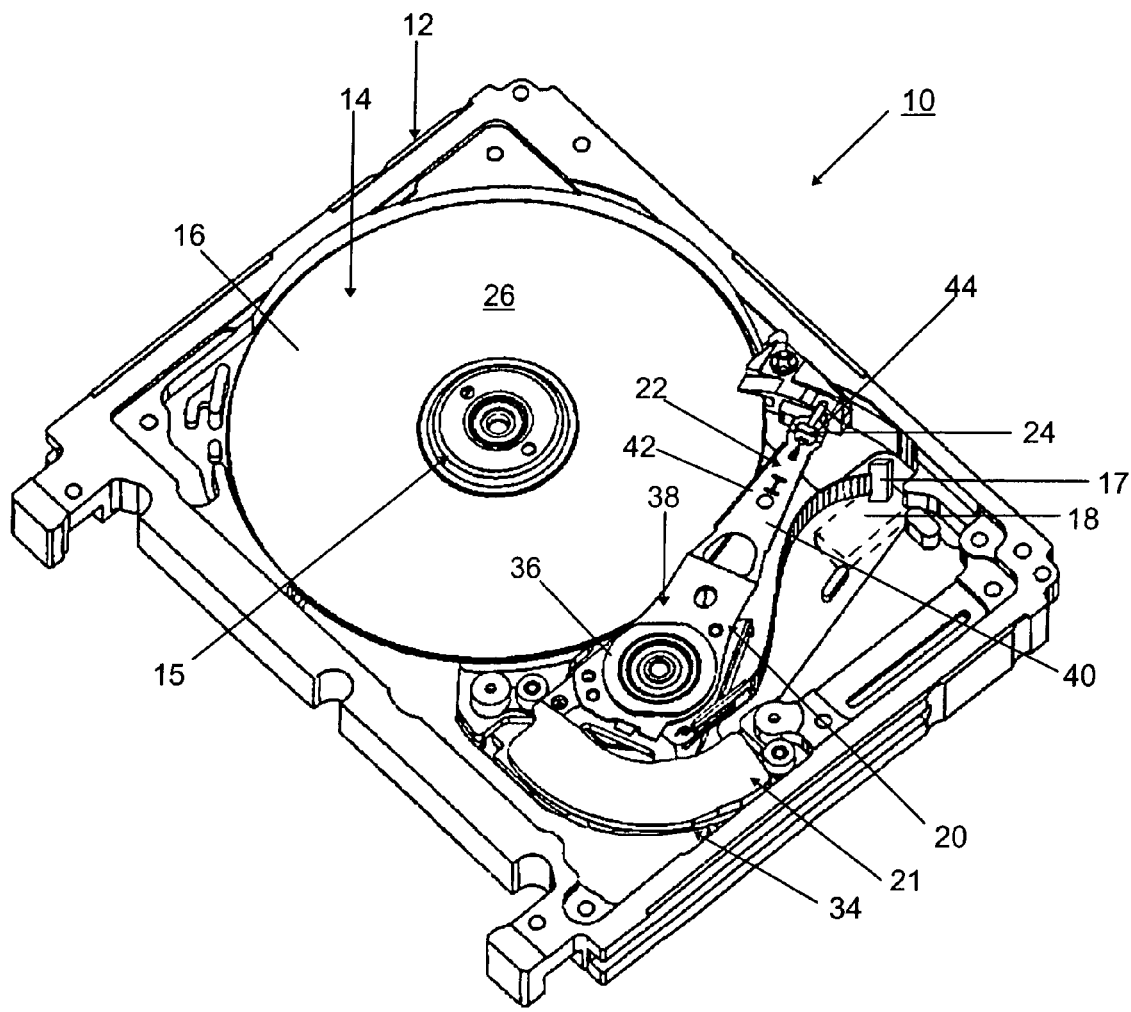
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a connector 17 and a drive circuitry 18 connected to the connector 17, and (iv) a head stack assembly 20 including an actuator assembly 21 and one or more head suspension assemblies 22, with each head suspension assembly 22 including a slider 24.

Each storage disk 16 includes one or two disk surfaces 26 that each has a plurality of data tracks (not shown) that store data, including a target track. Further, the storage disk 16 can also include non-data tracks, such as servo tracks and/or reference tracks. The data and servo information can also reside as different sectors on the same track. Data is read from the storage disk 16 during a read operation and data is transferred to the storage disk 16 during a write operation. The read and write operations can each include a seek mode during which the actuator assembly 21 rapidly moves the slider 24 to near the target track. The read and write operations can also include a settle mode which commences once the slider 24 is positioned proximate the target track. Further, the read and write operations include a track following mode once the slider 24 has settled or stabilized over the target track. Additionally, once the slider 24 stabilizes over the target track, the read and/or write operations include the transfer of data between the slider 24 and the storage disk 16.

The drive circuitry 18 sends and/or receives electrical signals from the slider 24 during read and/or write operations of the disk drive 10. In one embodiment, the drive circuitry 18 controls and/or directs current to the slider 24 to dynamically adjust and control the head-to-disk spacing. Alternatively, the drive circuitry 18 can control a voltage across portions of the slider 24 from a voltage source (not shown). In still an alternative embodiment, the drive circuitry 18 can concurrently control both the current to the slider 24 and the voltage across various portions of the slider 24.

As used herein, current, voltage and/or both current and voltage (also sometimes referred to herein as power) are generically referred to as an electrical stimulus, or simply a "stimulus". Further, an electrical signal that is received, measured or otherwise determined by the drive circuitry 18 from the slider 24 is referred to herein as an actual electrical response, or simply a "response".

The drive circuitry 18 can be included in a printed circuit board assembly (not shown). Further, the drive circuitry 18 can include one or more preamplifiers that can adjust and/or amplify the electrical signals that are transmitted between the slider 24 and other components of the drive circuitry 18. Moreover, the drive circuitry 18 can include one or more drivers (not shown) that can control and/or direct a specific stimulus, i.e., current, voltage and/or power, to various structures within the slider 24. In one embodiment, the drive circuitry 18 is secured to and/or enclosed by the drive housing 12.

The head stack assembly 20 illustrated in FIG. 1 also includes an actuator motor 34, an actuator hub 36, one head suspension assembly 22, and an actuator arm 38. The actuator motor 34 rotates the actuator arm 38 and the head suspension assembly 22 relative to the storage disk 16. The head stack assembly 20, alternately, can include a plurality of actuator arms 38 that each supports up to two head suspension assemblies 22. Each head suspension assembly 22 includes one slider 24 and a suspension 40 having a load beam 42 and a flexure 44. The suspension 40 is secured to the actuator arm 38, and supports the slider 24 proximate one of the disk surfaces 26 of the storage disk 16.

The slider 24 transfers information between the drive circuitry 18 and the storage disk 16. The design of the slider 24 can vary pursuant to the teachings provided herein. Further, various embodiments of disk drives and slider assemblies are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Figure 2A:
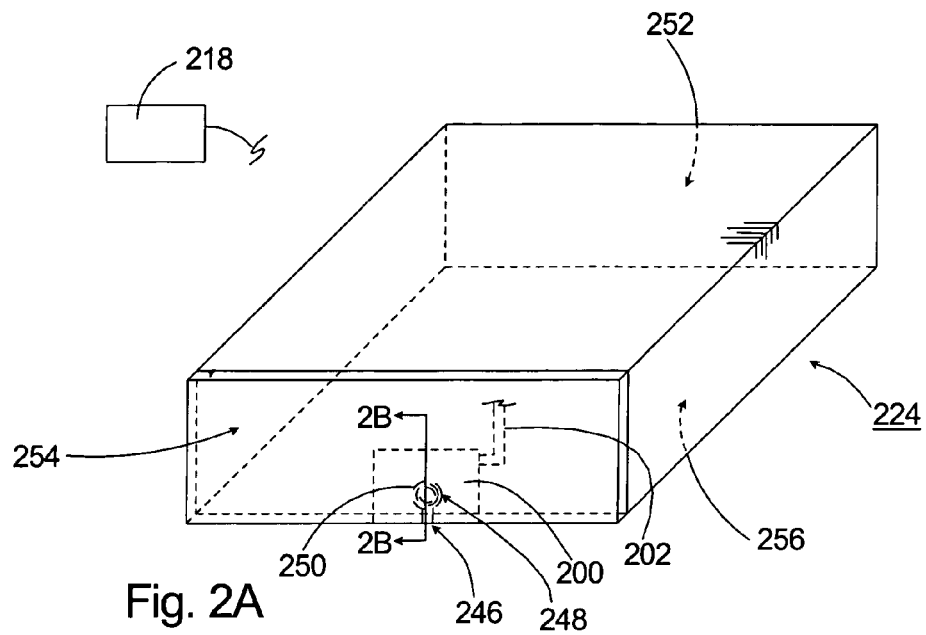
FIG. 2A is a perspective view of a slider having features of the present invention including a slider mover.

FIG. 2A illustrates a rear perspective view of one embodiment of the slider 224. In this embodiment, the slider 224 includes a read/write head 246, a slider mover 200 (illustrated in phantom) and a plurality of leads 202. The leads electrically connect the slider mover 200 to the drive circuitry 218. The read/write head 246 includes a write head 248 (illustrated in phantom) having a write element 250. The slider 224 further includes a leading surface 252, an opposed trailing surface 254 and a bottom first surface 256, which forms an air bearing surface (ABS) of the slider 224. The slider mover 200 is selectively used to move and/or deform portions of the slider 224 near the read/write head 246 in order to change the head-to-disk spacing.

More specifically, an electrical stimulus from the drive circuitry 218 is conducted through one or more of the leads 202. The stimulus causes the slider mover 200 to generate heat independently from heat generated by the write element 250. The heat is at least partially transferred to the area near the read/write head 246, thereby selectively causing thermal deformation of the read/write head 246 independently from any deformation (also referred to as "pole tip protrusion") that may be caused by heating of the write element 250 during a write operation, for example. The extent to which the slider mover 200 moves and/or deforms the slider 224 is at least partially dependent upon the extent or level of the stimulus, as described in greater detail below.

Figure 2B:
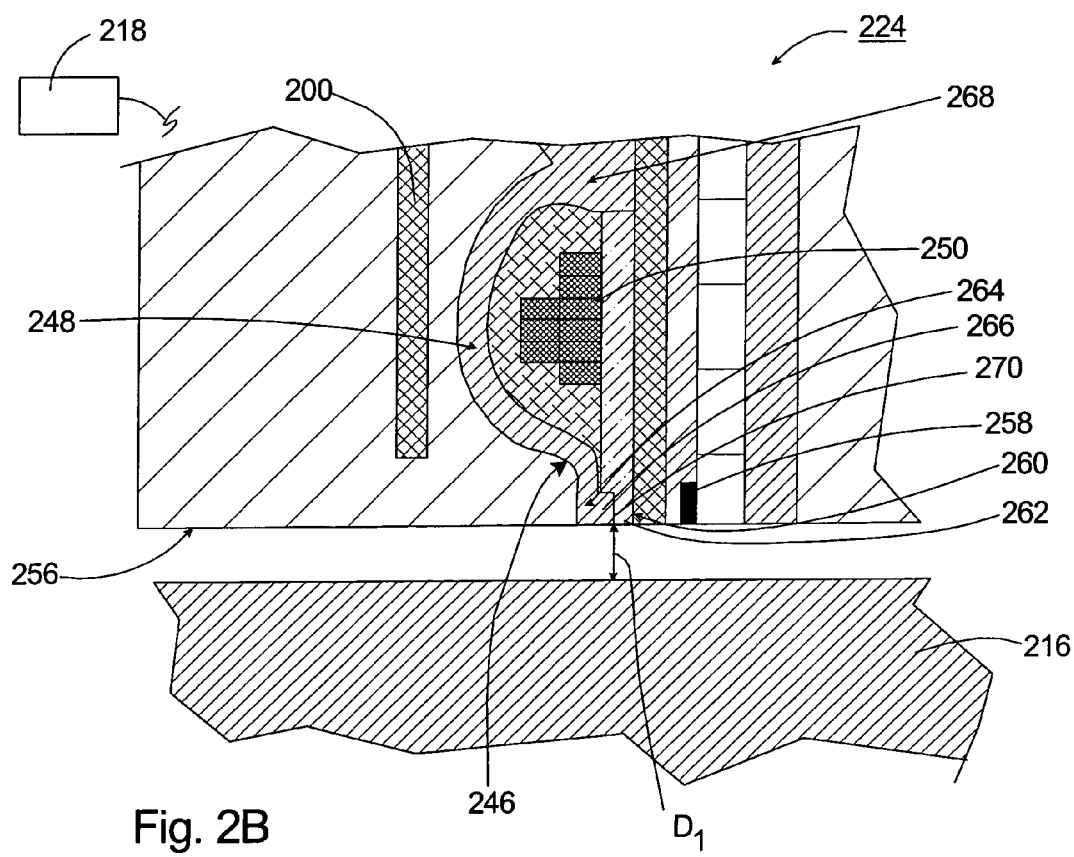
FIG. 2B is an enlarged cross-sectional view of a portion the slider in FIG. 2A while a first level of current is directed to the slider mover.

FIG. 2B is an enlarged, partial cross-sectional illustration of the slider 224 shown in FIG. 2A, and a portion of a storage disk 216. FIG. 2B illustrates that the read/write head 246 includes a read head 258 and the write head 248.

The positioning, dimensions and number of slider movers 200 can be varied. Moreover, the composition and configuration of the slider mover 200 can be varied to suit the design requirements of the slider 224 and the disk drive 10. For example, the slider mover 200 can include a single planar layer that is substantially parallel to the trailing surface 254. Alternatively, the slider mover 200 can also be positioned to not be parallel to the trailing surface 254. Further, the slider mover 200 can include a plurality of parallel or non-parallel planar or non-planar layers that are either parallel or non-parallel relative to the trailing surface 254. In this embodiment, the slider movers 200 can be electrically connected in series or in parallel, or the slider movers 200 can be individually electrically connected to provide a more customized control of the movement of portions of the slider 224.

In non-exclusive, alternative embodiments, the slider mover 200 can be disk shaped, elliptical, semi-circular, triangular, trapezoidal or another suitable configuration. In another embodiment, the slider mover 200 can include a continuous heating element having an even number of substantially parallel deformer legs (not shown) that wind back and forth in any direction near the write element 250. For example, the slider mover 200 can wind back and forth in a serpentine-shaped pattern. Alternately, the slider mover 200 can be somewhat coil shaped.

With these designs, the slider mover 200 can be configured to provide an increased amount of exposed surface area to efficiently transfer heat from the slider mover 200 to various portions of the slider 224. Additionally, the increased amount of exposed surface area of the slider mover 200 promotes a secure bonding between the slider mover 200 and other adjacent layers of the slider 224.

In the embodiment illustrated in FIG. 2B, the slider mover 200 is not in direct electrical communication with the read/write head 246. Stated another way, the slider mover 200 can be substantially electrically isolated from the read/write head 246, e.g. the slider mover 200 is not in direct contact with the read/write head 246, nor is there any significant electrical coupling between the slider mover 200 and the read/write head 246. Alternatively, the slider mover 200 and the read/write head 246 can be electrically coupled, or they can be directly connected.

In the embodiment illustrated in FIG. 2B, the write head 248 includes the write element 250, a leading pole 260 having a leading pole tip 262, a trailing pole 264 having a trailing pole tip 266, a yoke 268, and a write head gap 270.

More specifically, FIG. 2B shows the general relationship between the read/write head 246 and the storage disk 216 (also referred to herein as a first head-to-disk spacing $D_1$) when the drive circuitry 218 is directing a first level of current or power to the slider mover 200. As used herein, the first level of stimulus can be a relatively low stimulus level or no stimulus, for example. In the embodiment illustrated in FIG. 2B, the first level of current or power is approximately zero. At various times during operation of the disk drive, relatively little stimulus or no stimulus is directed to the slider mover 200, and little or no deformation caused by the slider mover 200 occurs in the area of the read/write head 246 or the air bearing surface 256, as illustrated in FIG. 2B.

Figure 2C:
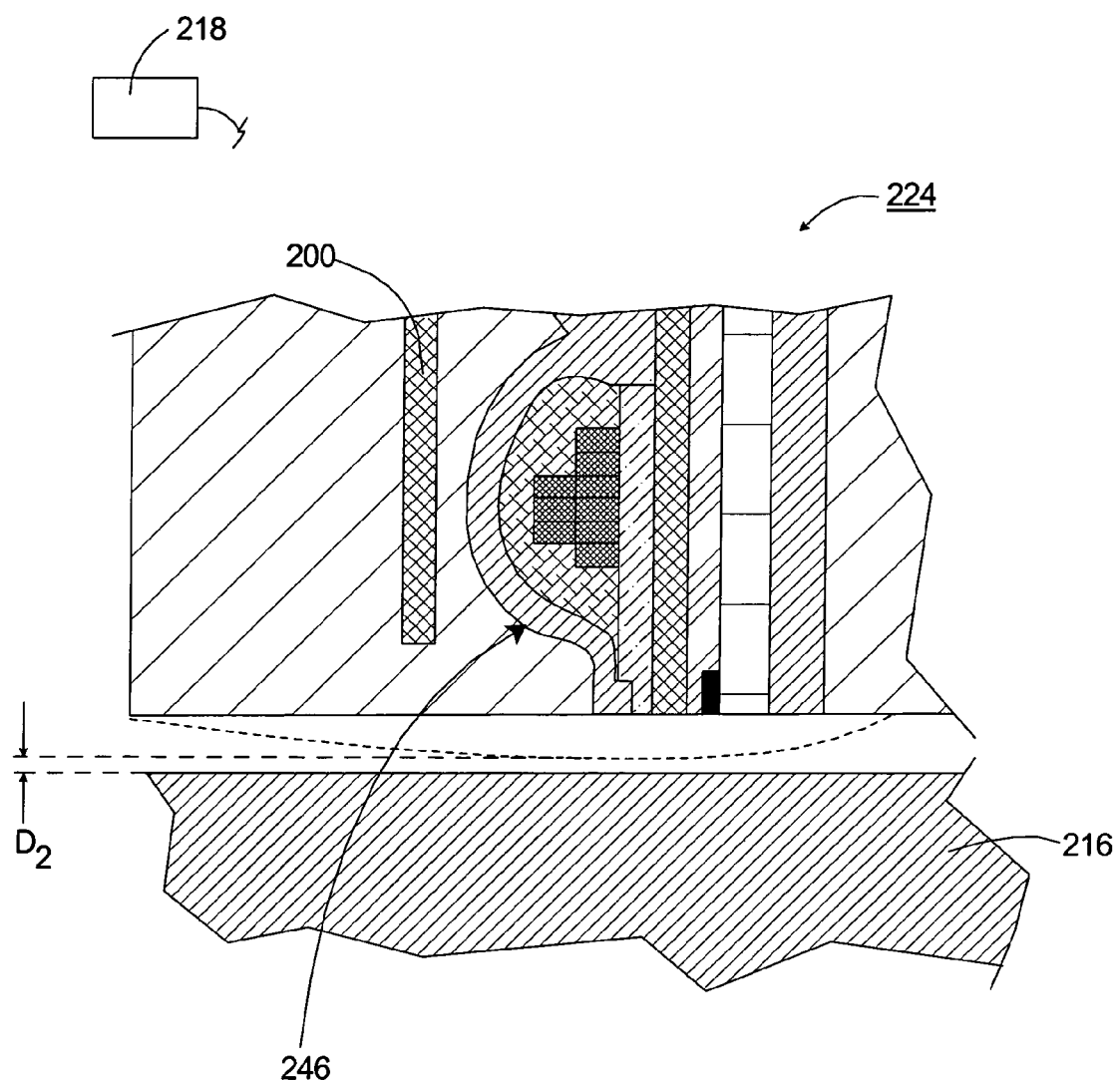
FIG. 2C is an enlarged cross-sectional view of a portion of the slider in FIG. 2A including a simplified representation of a portion of the slider while a second level of current is directed to the slider mover.

FIG. 2C illustrates the relationship between the read/write head 246 and the storage disk 216 (also referred to herein as a second head-to-disk spacing $D_2$) once the drive circuitry 218 directs a second level of stimulus to the slider mover 200. In FIG. 2C, the second level of stimulus is greater than the first level of stimulus, and causes sufficient thermal expansion of a portion of the slider 224 toward the storage disk 216. In some embodiments, the second level of stimulus can be sufficient to cause non-destructive head-to-disk contact. In these embodiments, the non-destructive head-to-disk contact can be utilized to facilitate monitoring and/or adjusting the actual head-to-disk spacing as required by the disk drive 10.

The portion of the slider 224 illustrated in phantom in FIG. 2C is shown in phantom as a relatively smooth curve for purposes of illustration and to show the contrast with the slider 224 in the first position (illustrated by solid lines). It is recognized that when the slider 224 is in the second position, the actual configuration of the slider 224 including the read/write head 246 may not be completely smooth, but can have a somewhat jagged or otherwise inconsistent configuration.

As provided herein, applying the second level of stimulus to the slider mover 200 can be used to intentionally induce a decreased head-to-disk spacing, or even head-to-disk contact, during production and/or self-testing of the disk drive, and/or on a predetermined (automatic) or an "as needed" (manual) basis during in situ operation of the disk drive 10. For example, by purposely causing non-destructive head-to-disk contact or withdrawing the slider 224 from non-destructive head-to-disk contact, the disk drive 10 can be calibrated to more precisely determine, monitor and/or adjust the head-to-disk spacing during various operations of the disk drive 10. Systems and methods for determining when head-to-disk contact occurs or ceases to occur are disclosed in U.S. patent application Ser. No. 11/101,112, filed by Schreck et al., and assigned to Maxtor Corporation. To the extent permitted, the contents of U.S. patent application Ser. No. 11/101,112 are incorporated herein by reference.

As indicated above, the drive circuitry 218 can send or direct a stimulus to the slider mover 200 to heat the slider mover 200. Heat is generated at the slider mover 200 as a result of the resistivity of the material used to form the slider mover 200. The drive circuitry 218 can control the voltage, the current, or a combination of both voltage and current, that is directed to the slider mover 200 in order to heat the slider mover 200 to the appropriate extent.

In certain embodiments, the slider mover 200 can be used during transitions between various drive operations, in order to adjust the head-to-disk spacing as needed. More specifically, the drive circuitry 18 can adjust the power that is directed to the slider mover 200 in advance of a particular drive operation so that the read/write head 246 will be in a better position relative to the storage disk 216 for the upcoming drive operation.

Figure 3A:
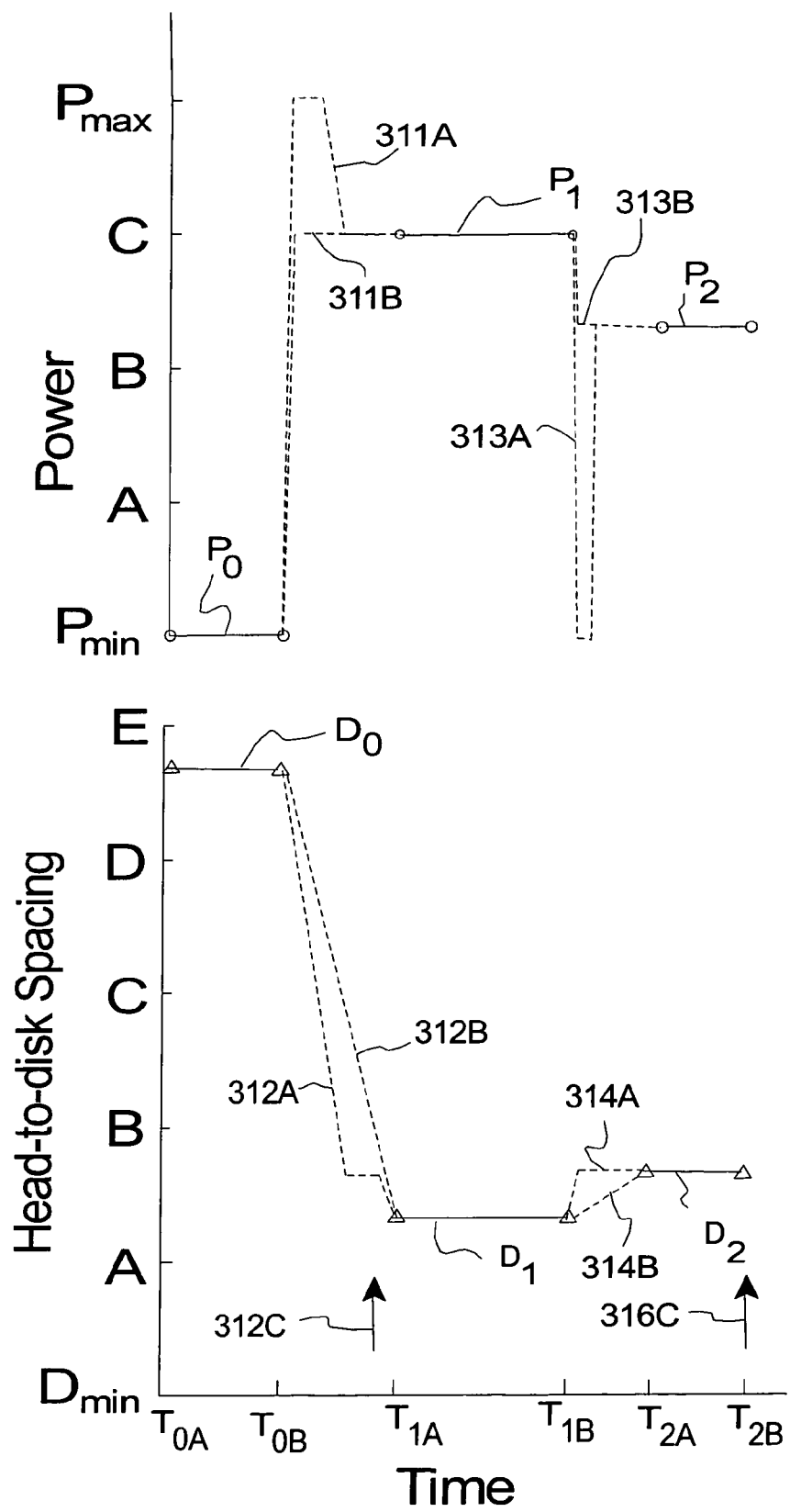
FIG. 3A is a graph that illustrates two alternative, non-exclusive, embodiments of how power can be delivered to the slider mover for a single head between multiple power levels.

For example, FIG. 3A illustrates two alternative, non-exclusive, embodiments of how power can be delivered to the slider mover for a single head in transition between increasing power levels $P_0$, $P_1$, and $P_2$. In FIG. 3A, lines 311A, 311B represent alternative profiles of how power can be directed to the slider mover during a first transition, the time between $T_{0B}$ and $T_{1A}$ (transition from initial to read operation, $P_0$ to $P_1$). Line 311A illustrates that the drive circuitry quickly ramps up the transition power that is directed to the slider mover to at or near the maximum power that can be directed to the slider mover. Subsequently, the drive circuitry quickly ramps down the variable transition power until the power is equal to $P_1$. In this embodiment, the transition power is initially set at a level in excess of $P_1$ (to hasten reaching fly height equilibrium) and then decays to the lower $P_1$ once equilibrium at the read head-to-disk spacing is reached. This general type of power scheme during which a maximum or excess power level is used that is then reduced is referred to herein as "overshoot". Alternatively, profile 311B illustrates that drive circuitry quickly ramps up the transition power that is directed to the slider mover until the transition power is equal to $P_1$.

Further, in FIG. 3A, line 312A represents a simplified profile of how the head-to-disk spacing will change when the power profile 311A is applied to the slider mover. Somewhat similarly, line 312B represents a simplified profile of how the head-to-disk spacing will change when power profile 311B is applied to the slider mover. It is recognized that although lines 312A, 312B are shown as somewhat basic, straight lines, the actual profiles would likely be more complex. For example, profile 312B would asymptotically approach $D_1$ over time, rather than collide with $D_1$ as illustrated. In FIG. 3A, arrow 312C represents the approximate time when reading commences.

It should be noted that profile 311A will result in the head-to-disk spacing approaching the read head-to-disk spacing faster than profile 311B. It should also be noted that other power profiles can be utilized in the first transition. For example, the drive circuitry can initially direct power to the slider at any level that is greater than or equal to $P_1$ and less than or equal to the maximum power $P_{max}$. Subsequently, the drive circuitry quickly ramps down the transition power until the transition power is equal to $P_1$. In alternative, non-exclusive examples, the transition power during a portion of the first transition can be approximately 10, 25, 50, 100, 200 or 400 percent greater than $P_1$.

It is recognized that if a head-to-disk contact procedure or a performance test is performed during the initial startup, that the power delivered to the slider mover will be different than the power profiles 311A, 311B that are illustrated in FIG. 3A.

In FIG. 3A, lines 313A, 313B represent alternative profiles of how power can be directed to the slider mover during a second transition, the time between $T_{1B}$ and $T_{2A}$ (transition from read to pre-write, $P_1$ to $P_2$). Profile 313A illustrates that the drive circuitry quickly ramps down the power that is directed to the slider mover to at or near the minimum power $P_{min}$ that can be directed to the slider mover. Subsequently, the drive circuitry quickly ramps up the power until the power is equal to $P_2$. In this embodiment, the transition power is initially set at a level that is lower than $P_2$ (to hasten reaching fly height equilibrium) and then increased to $P_2$ (i.e. undershoot and settle) once equilibrium at the pre-write head-to-disk spacing is reached. Alternatively, profile 313B illustrates that the drive circuitry quickly ramps down the power that is directed to the slider mover until the power is equal to $P_2$. These types of power profiles 313A, 313B are designed to prepare for the write process in which heat from the write coil 250 must be compensated by the slider mover 200 in order to achieve a substantially constant spacing $D_2$ during the write process.

It should be noted that profile 313A will achieve the pre-write head-to-disk spacing faster than profile 313B. It should also be noted that other power profiles can be utilized in the second transition. For example, the drive circuitry can initially direct the transition power to the slider mover at any level that is less than or equal to $P_2$ and greater than or equal to the minimum power $P_{min}$. Subsequently, the drive circuitry quickly ramps up the transition power until the transition power is equal to $P_2$. In alternative, non-exclusive examples, the transition power during a portion of the second transition can be approximately 10, 25, 50 or 100 percent less than $P_2$.

Further, in FIG. 3A, line 314A represents a simplified profile of how the head-to-disk spacing will change when power profile 313A is applied to the slider mover. Somewhat similarly, line 314B represents a simplified profile of how the head-to-disk spacing will change when power profile 313B is applied to the slider mover. It is recognized that although lines 314A, 314B are shown as somewhat basic, straight lines, the actual profiles would likely be more complex. For example, profile 314B would actually asymptotically approach $D_2$ over time. Arrow 316C represents when writing commences.

Figure 3B:
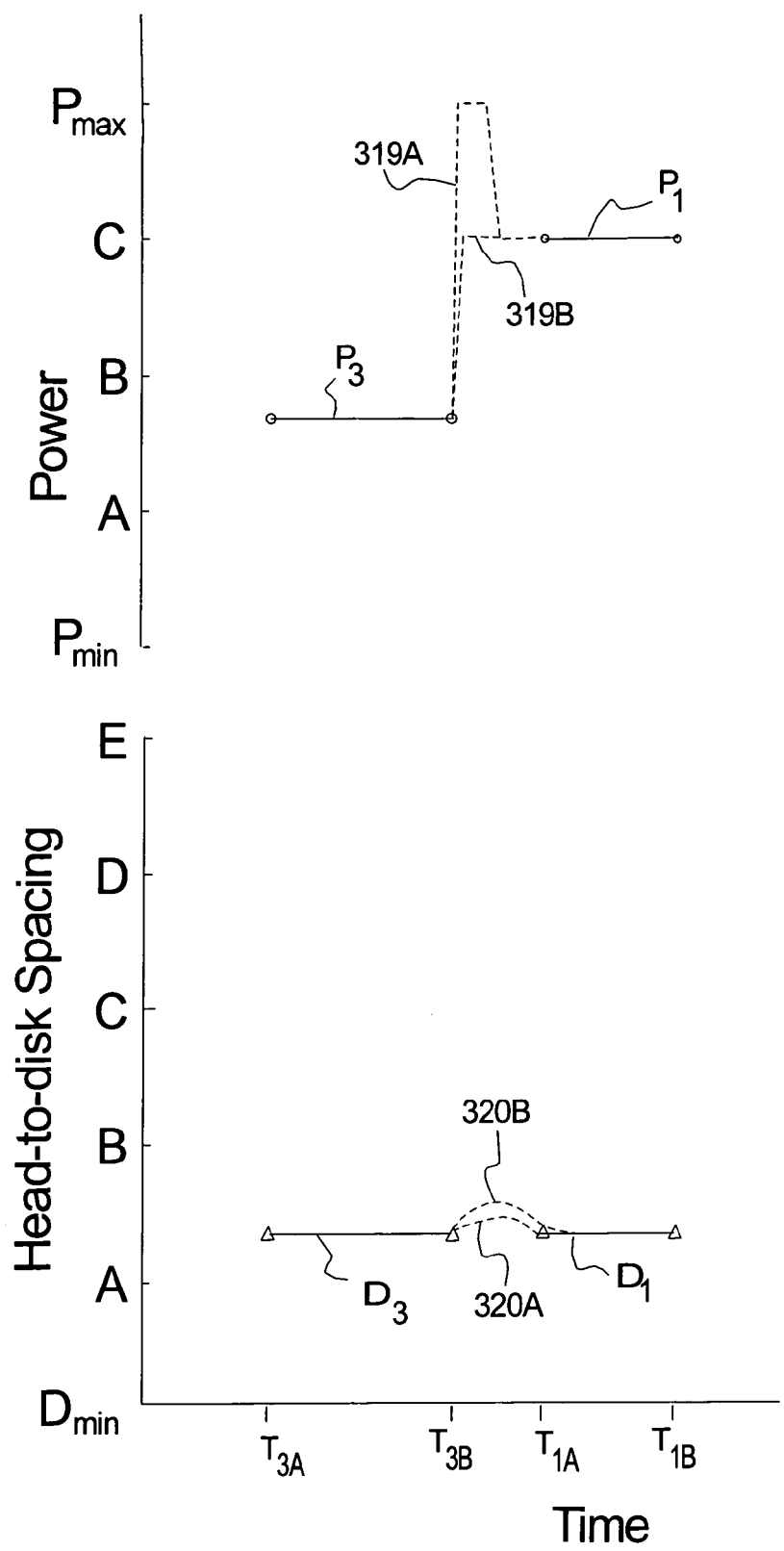
FIG. 3B is a graph that illustrates two alternative, non-exclusive, embodiments of how power can be delivered to the slider mover during other transitions.

FIG. 3B illustrates how power is applied during a write to read transition. In FIG. 3B, lines 319A, 319B represent alternative profiles of how power can be directed to the slider mover during a write to read transition, the time between $T_{3B}$ and $T_{1A}$ (transition from $P_3$ to $P_1$). It should be noted that, in certain designs, when a read operation follows a write operation, the slider mover is controlled to allow WPTP to subside prior to directing the read power level to the slider mover to avoid head-to-disk contact.

Profile 319A illustrates that drive circuitry quickly ramps up the power that is directed to the slider mover to the maximum power that can be directed to the slider mover. Subsequently, the drive circuitry quickly ramps down the power until the power is equal to $P_1$. Alternatively, profile 319B illustrates that drive circuitry quickly ramps up the power that is directed to the slider mover until the power is equal to $P_1$.

Further, in FIG. 3B, line 320A represents a simplified profile of how the head-to-disk spacing will change when power profile 319A is applied to the slider mover. Somewhat similarly, line 320B represents a simplified profile of how the head-to-disk spacing will change when power profile 319B is applied to the slider mover. It should be noted that profile 319A can result in the head-to-disk spacing remaining closer to $D_1$ better than profile 319B. It should also be noted that although the curves represented in profiles 320A, 320B are shown as relatively basic in shape for the sake of simplicity, the actual profiles would be somewhat more complex. For example, the head-to-disk spacing profile 320B would actually increase, and then asymptotically approach $D_1$ over time.

The foregoing examples demonstrate various embodiments of how the slider mover 200 (illustrated in FIG. 2A) can be used to position the read/write head prior to or during a particular drive operation. Depending upon the type of material that is used to form the slider mover 200, the resistance of the slider mover 200 can vary with changes in temperature. The thermal coefficient of resistivity ("TCR") of each material dictates the degree to which the resistance of the slider mover 200 varies as a function of temperature changes.

Thus, depending upon the design requirements of the disk drive 10, the electrical resistivity of the material used to form the slider mover 200 can vary. In one embodiment, the slider mover 200 is formed from a material having a relatively low thermal coefficient of resistivity. With this design, changes in the temperature of the slider mover 200 have a decreased impact on the resistance of the slider mover 200. Therefore, more power can be delivered to the slider mover 200 from the voltage source and thus faster actuation is achieved. An additional advantage of this low positive TCR embodiment of the present invention is that the drive electronics does not need to monitor the resistance of the mover 200 in order to achieve the desired power profile.

In alternative embodiments, the slider mover 200 can be formed from a material having a negative thermal coefficient of resistivity. For example, in one embodiment, the material used to form the slider mover 200 can include doped silicon. In these embodiments, less voltage overshoot is needed to achieve a desired power overshoot. However, in this negative TCR embodiment, the resistance of the slider mover 200 must be either monitored or predicted by the drive circuitry 218 (illustrated in FIG. 2A) in order to achieve a desired power profile. Depending upon the type of drive operation, the material used to form the slider mover 200 can be a critical component for accurate head-to-disk spacing of the read/write head 246 (illustrated in FIG. 2B) relative to the storage disk 216 (illustrated in FIG. 2B).

For example, during an overshoot power profile described previously, the temperature of the slider mover 200 increases rapidly, and then decreases once the power level is decreased. These rapid temperature changes can likewise result in significant resistance changes of the slider mover 200, which can change the dynamics of the effect of the slider mover 200 on the head-to-disk spacing.

Figure 4:
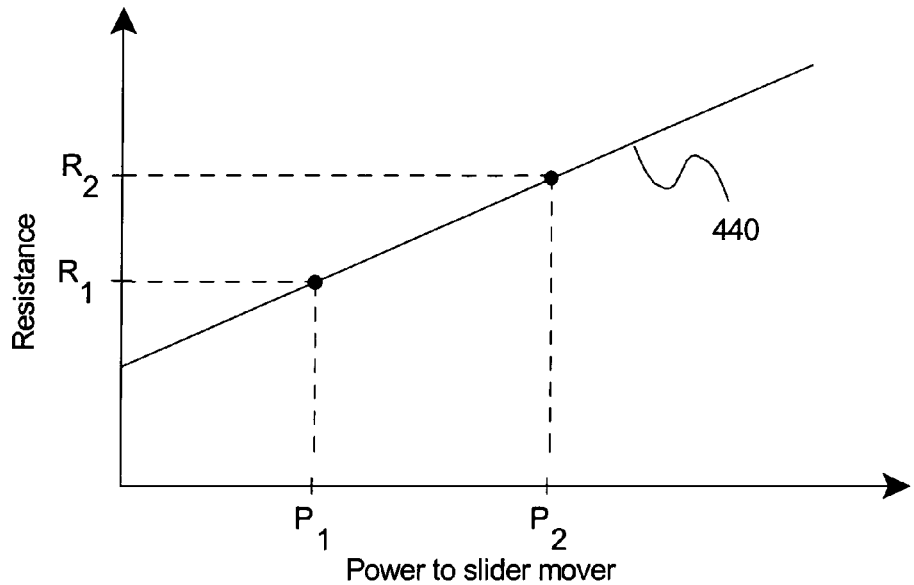
FIG. 4 is a graph showing the relationship of resistance as a function of power to the slider mover.

FIG. 4 is a graph illustrating one embodiment of a relationship between power delivered to the slider mover, which causes an increase in temperature of the slider mover, as a function of the resistance of the slider mover. In the embodiment illustrated in FIG. 4, the material used to form the slider mover has a positive TCR. In this embodiment, at a relatively low power level $P_1$, the slider mover exhibits a first resistance $R_1$. At an increased power level $P_2$, the slider mover exhibits a second (increased) resistance $R_2$. Thus, in this embodiment, as power to the slider mover increases, resistance of the material used to form the slider mover also increases, as indicated by line 440. In alternative embodiments, as the TCR of the material used to form the slider mover decreases, the slope of line 440 also decreases such that the increase in resistance of the slider mover is not as pronounced with an increase in power. Moreover, in one embodiment, a negative TCR material is used to form the slider mover, resulting in a decrease in resistance of the slider mover with an increase in power.

Further, if the resistance of the slider mover increases, at a constant voltage delivered to the slider mover, the current decreases according to Ohm's Law:

$$V=IR,$$

where V=voltage, I=current, and R=resistance.

Therefore, during a drive operation or series of drive operations that utilize overshoot of power directed to the slider mover, in the above embodiment, the changing resistance should be taken into consideration. For instance, in this embodiment, in order to achieve a particular temperature output of the slider mover to precisely control the head-to-disk spacing, the voltage and/or current need to be monitored to ensure the correct amount of power being delivered. Alternatively, the resistance of the slider mover can be predicted based on the history of power input and ambient temperature in the drive. However, these methods can be rather complex due to the complex time response of the slider mover 200 temperature.

Figure 5:
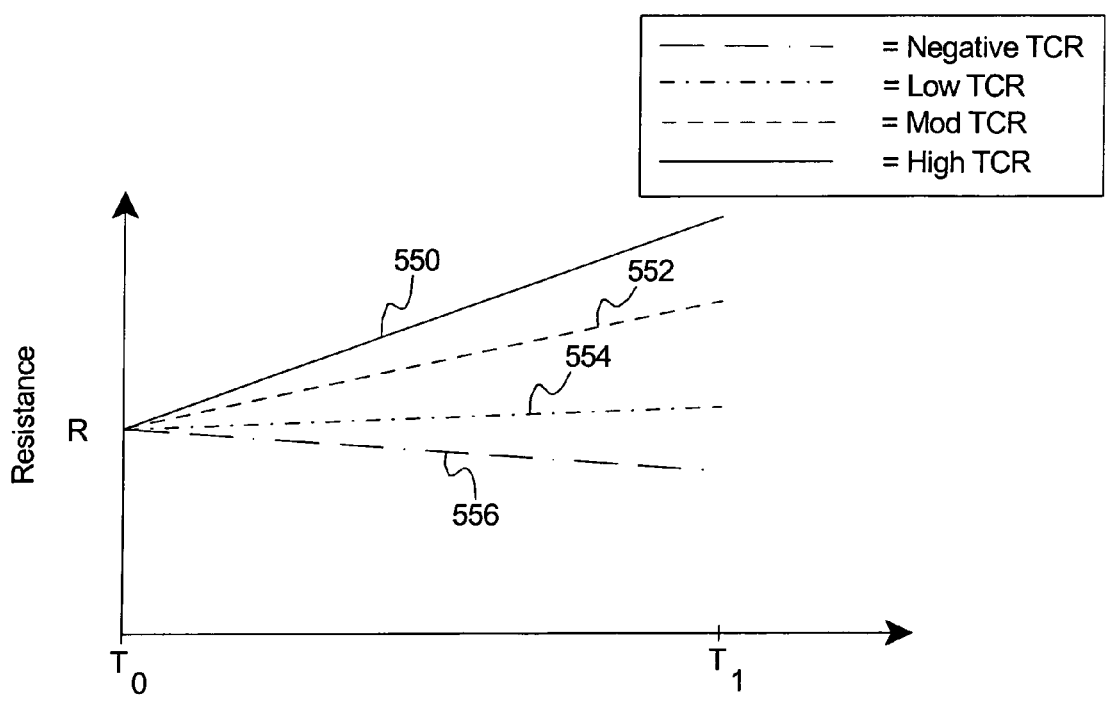
FIG. 5 is a graph showing the relationship of resistance as a function of temperature for four embodiments of the slider mover.

FIG. 5 is a graphical representation of resistance as a function of temperature of four different slider movers, each being formed substantially from a different TCR material. Line 550 is representative of the resistance of a relatively high TCR material, line 552 is representative of the resistance of a moderate TCR material, line 554 is representative of the resistance of a relatively low TCR material, and line 556 is representative of the resistance of a very low, e.g., negative TCR material, all as a function of temperature. As used herein, a relatively high TCR material is any material that exhibits greater than approximately a 0.2 percent increase in resistance per degree Celsius increase in temperature. For example, $Ni_{80}Fe_{20}$ (also referred to herein as Permalloy) has a TCR of approximately 0.2 percent/° C. and copper has a TCR of 0.38 percent/° C. A low TCR material is any material that exhibits not greater than a 0.1 percent increase in resistance per degree Celsius increase in temperature. A moderate TCR material is any material having a TCR between the relatively high TCR material and the relatively low TCR material. A negative TCR material is any material that exhibits a decrease in resistance with an increase in temperature.

In one embodiment, the slider mover provided herein is formed substantially from a relatively low TCR material. For example, one material having a relatively low TCR is a copper-manganese alloy such as $Cu_{96.5}Mn_{3.5}$, which has a TCR of approximately 0.0002. As an example, a material such as $Cu_{96.5}Mn_{3.5}$ has a TCR that is approximately 10% of the TCR of Permalloy that is sometimes used for various structures in the slider and/or elsewhere in the drive. Stated another way, vary little change in its resistance is expected for a slider mover formed substantially from $Cu_{96.5}Mn_{3.5}$ that is subject to vastly changing temperatures.

Moreover, another consideration for the materials used to form the slider mover and the leads includes the resistivity of such materials. Resistivity is a measure of the material's ability to oppose the flow of electric current. The lower the resistance of the leads to the slider mover, the less power that is consumed while carrying current to the slider mover. Further, the timing of the use of the slider mover can be influenced by a higher resistivity material. As provided below, the resistivity is taken into account with the design of the present invention in order to decrease power consumption and/or to mitigate timing issues that may result from using higher resistivity materials normally associated with typical leads. Because the timing of directing power to the slider mover can be critical, using a material with a relatively low resistivity can increase the timing accuracy.

In one embodiment, the resistivity of the material used to form the slider mover and one or more leads that extend from the slider mover is less than approximately 50 microohm-centimeters. In non-exclusive, alternative embodiments, the material used to form the slider mover and/or one or more leads that extend from the slider mover is less than approximately 20, 15, 12, 11 or 10 microohm-centimeters. For example, a slider mover formed from $Cu_{96.5}Mn_{3.5}$ has a resistivity of approximately 11.0 microohm-centimeters. For instance, this material will reduce lead resistance by approximately 45% over a material such as Permalloy.

Further, in one embodiment, the type of material that is used for the slider mover and the leads to and from the slider mover has a relatively high melting point to resist damage due to use during maximum or near maximum power operations such as overshoot. Thus, the present invention includes a balance between materials having a relatively low TCR and relatively low resistivity, along with materials having a relatively high melting point. In one embodiment, a relatively high melting point is at least approximately 750° C. In non-exclusive, alternative embodiments, the slider mover can be formed from a material having a melting point of greater than approximately 900° C., 1,000° C., 1,200° C., 1,400° C., or higher.

It is recognized that although different materials can be used which would provide a relatively low TCR, not as many materials combine a relatively low TCR with relatively low resistivity and a relatively high melting point. $Cu_{96.5}Mn_{3.5}$ is but one example. Other embodiments of slider movers having materials satisfying these requirements (with approximate TCR in parenthesis) include those formed substantially from $Cu_{60}Ni_{40}$ (Constantan, 0.00002), $Cu_{84}Mn_{12}Ni_4$ (Manganin, 0.00004), $Ni_{80}Cr_{20}$ (Chromel, 0.0001), $Ni_{60}Fe_{24}Cr_{16}$ (Nichrome, 0.0004), $Cu_{88}Sn_{12}$ (0.0005), $Cu_{95}Sn_5$ (0.001), $Cu_{91}Mn_7Fe_2$ (0.00012), $Au_{67}Cu_{15}Ag_{18}$ (0.000529), and $Au_{67}Ag_{33}$ (0.00065), as non-exclusive examples. In still alternative embodiments, the TCR can have a negative value, such that the resistance of the slider mover decreases as the temperature increases.

Because of the power level and timing precision required with the present invention to allow the greatest level of accuracy for providing a desired head-to-disk spacing, the design and selection of specific materials needed for the slider mover can reduce the need to rigorously adjust other parameters in order to achieve the same overall accuracy of the slider mover. For example, monitoring resistance changes and temperature changes, and adjusting direction of power by the drive circuitry based in part on these changes can be extremely complex.

Additionally, in another embodiment, the design of the slider mover balances the benefits of a relatively low TCR, with the usefulness of a TCR that is not so low that temperature cannot be monitored from the resistance changes in the slider mover. Stated another way, it is often useful to monitor temperature based on the change in resistance of a structure. The slider mover can have a relatively low TCR, but not so low that resistance changes are too difficult to ascertain. For instance, a range of TCR's that may be suitable in one design can be between 0.00005 and 0.001. However, suitable materials can be used having a TCR outside this range.

Thus, in the list of various materials provided above, in a given application, without other provisions, Constantan may have a TCR that is too low to accurately monitor temperature of a given structure since the resistance of Constantan only changes approximately 1% of that of Permalloy for a given temperature change, as an example. However, materials having a TCR close to zero may be suitable to use in a slider mover that is not concerned with monitoring temperature, for example. In one embodiment of the slider mover, the resistance of the slider mover does not increase by more than 1% over a change in temperature of the slider mover of 500° C.

While the particular slider 24 and disk drive 10, as herein shown and disclosed in detail, is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A disk drive comprising:
   a drive housing;
   a storage disk that is rotatably coupled to the drive housing; and
   a slider including a head that magnetically interacts with the storage disk, and a slider mover that moves a portion of the slider to adjust a head-to-disk spacing during operation of the disk drive, the slider mover being substantially formed from a material having a thermal coefficient of resistivity that is less than approximately 0.001/° C., wherein the material has a resistivity that is less than approximately 15 microohm-centimeters.

2. The disk drive of claim 1 wherein the material has a melting point that is greater than approximately 300° C.

3. The disk drive of claim 2 wherein the material has a melting point that is greater than approximately 750° C.

4. The disk drive of claim 1 wherein the material has a thermal coefficient of resistivity that is less than approximately 0.0005/° C.

5. The disk drive of claim 4 wherein the material has a thermal coefficient of resistivity that is less than approximately 0.0002/° C.

6. The disk drive of claim 1 wherein the material has a thermal coefficient of resistivity that is less than approximately 0.0001/° C.

7. The disk drive of claim 1 wherein the material has a thermal coefficient of resistivity that is less than zero/° C.

8. The disk drive of claim 1 further comprising a drive circuitry and a lead, the lead conducting electricity between the slider mover and the drive circuitry, the lead being formed substantially from a material having a thermal coefficient of resistivity that is less than approximately 0.001/° C.

9. The disk drive of claim 1 wherein the lead has a resistivity that is less than approximately 20 microohm-centimeters.

10. The disk drive of claim 1 further comprising a drive circuitry and a lead, the lead conducting electricity between the slider mover and the drive circuitry, the lead being formed from a material having the substantially the same composition as the material that forms the slider mover.

11. The disk drive of claim 1 wherein the material includes a copper alloy.

12. The disk drive of claim 1 wherein the material includes a copper-manganese alloy.

13. The disk drive of claim 1 wherein the material includes a copper-tin alloy.

14. The disk drive of claim 1 wherein the material includes a copper-nickel alloy.

15. A disk drive comprising:
a drive housing;
a storage disk that is rotatably coupled to the drive housing; and
a slider including a head that magnetically interacts with the storage disk, and a slider mover that moves a portion of the slider to adjust a head-to-disk spacing during operation of the disk drive, the slider mover being formed from a material having a resistivity that is less than approximately 15 microohm-centimeters and a thermal coefficient of resistivity that is less than approximately 0.001/° C.

16. The disk drive of claim 15 wherein the material has a melting point that is greater than approximately 300° C.

17. The disk drive of claim 16 wherein the material has a melting point that is greater than approximately 1,000° C.

18. The disk drive of claim 15 wherein the material has a thermal coefficient of resistivity that is less than approximately 0.0005/° C.

19. The disk drive of claim 15 wherein the material has a thermal coefficient of resistivity that is less than zero/° C.

20. The disk drive of claim 15 further comprising a drive circuitry and a lead, the lead conducting electricity between the slider mover and the drive circuitry, the lead being formed substantially from a material having a thermal coefficient of resistivity that is less than approximately 0.001/° C.

21. The disk drive of claim 15 further comprising a drive circuitry and a lead, the lead conducting electricity between the slider mover and the drive circuitry, the lead being formed substantially from a material having a resistivity that is less than approximately 50 microohm-centimeters.

22. The disk drive of claim 15 wherein the material includes a copper-manganese alloy.

23. The disk drive of claim 15 wherein the material includes a copper-tin alloy.

24. A method for manufacturing a disk drive, the method comprising the steps of:
rotatably coupling a storage disk to a drive housing; and
providing a slider having (i) a head that magnetically interacts with the storage disk, and (ii) a spaced-apart slider mover that moves a portion of the slider to adjust a head-to-disk spacing during operation of the disk drive, and forming the slider mover from a material having a thermal coefficient of resistivity that is less than approximately 0.001/° C. and having a resistivity that is less than approximately 15 microohm-centimeters.

25. The method of claim 24 wherein the step of providing a slider includes forming the slider mover from a material having a melting point that is greater than approximately 300° C.

26. The method of claim 24 wherein the step of providing a slider includes forming the slider mover from a material having a thermal coefficient of resistivity that is less than approximately zero/° C.

27. The method of claim 24 further comprising the step of conducting electricity between the slider and a drive circuitry of the disk drive using a lead having a thermal coefficient of resistivity that is less than approximately 0.001/° C.

28. A method for manufacturing a disk drive, the method comprising the steps of:
rotatably coupling a storage disk to a drive housing; and
providing a slider having (i) a head that magnetically interacts with the storage disk, and (ii) a spaced-apart slider mover that moves a portion of the slider to adjust a head-to-disk spacing during operation of the disk drive, and forming the slider mover from a material having a resistivity that is less than approximately 15 microohm-centimeters and a thermal coefficient of resistivity that is less than approximately 0.001/° C.

29. The method of claim 28 wherein the step of providing a slider includes forming the slider mover from a material having a melting point that is greater than approximately 300° C.

30. The method of claim 28 wherein the step of providing a slider includes forming the slider mover from a material having a thermal coefficient of resistivity that is less than approximately zero/° C.

31. The method of claim 28 further comprising the step of conducting electricity between the slider and a drive circuitry of the disk drive using a lead having a thermal coefficient of resistivity that is less than approximately 0.001/° C.

* * * * *